US010423950B2

(12) United States Patent
Staflin

(10) Patent No.: US 10,423,950 B2
(45) Date of Patent: Sep. 24, 2019

(54) METHOD AND ARRANGEMENT FOR AUTHORIZING A USER

(71) Applicant: Mopper AB, Stockholm (SE)

(72) Inventor: Rolf Staflin, Uppsala (SE)

(73) Assignee: Mopper AB, Stockholm (SE)

( * ) Notice: Subject to any disclaimer, the term of this patent is extended or adjusted under 35 U.S.C. 154(b) by 325 days.

(21) Appl. No.: 14/354,490

(22) PCT Filed: Oct. 26, 2012

(86) PCT No.: PCT/SE2012/000167
§ 371 (c)(1),
(2) Date: Apr. 25, 2014

(87) PCT Pub. No.: WO2013/062459
PCT Pub. Date: May 2, 2013

(65) Prior Publication Data
US 2014/0310185 A1    Oct. 16, 2014

Related U.S. Application Data

(60) Provisional application No. 61/551,491, filed on Oct. 26, 2011.

(51) Int. Cl.
*G06Q 20/32* (2012.01)
*H04W 12/06* (2009.01)
(Continued)

(52) U.S. Cl.
CPC ..... *G06Q 20/3276* (2013.01); *G06Q 20/3227* (2013.01); *G06Q 20/382* (2013.01);
(Continued)

(58) Field of Classification Search
None
See application file for complete search history.

(56) References Cited

U.S. PATENT DOCUMENTS

2007/0233615 A1* 10/2007 Tumminaro ............ 705/75
2008/0222048 A1*  9/2008 Higgins et al. ........ 705/67
(Continued)

FOREIGN PATENT DOCUMENTS

EP    2128809 A1 * 12/2009 ............ G06Q 20/00
EP    2546791 A1    1/2013
(Continued)

OTHER PUBLICATIONS

Dodson et al. ("Secure, Consumer-Friendly Web Authentication and Payments with a Phone", In Proceedings of the Second International Conference on Mobile Computing, Applications, and Services (MobiCASE), Santa Clara, CA, Oct. 2010.).*

(Continued)

*Primary Examiner* — Steven S Kim
*Assistant Examiner* — Jason B Fenstermacher
(74) *Attorney, Agent, or Firm* — Renner, Otto, Boisselle & Sklar, LLP

(57) ABSTRACT

The present invention relates to a method and system for activating a first mobile terminal and a second mobile terminal to operate with a server. The method performed by a processor of the mobile device, the method comprising: providing a first authentication data from said first terminal to the server; verifying said first authentication data; providing a first data set and a unique identity by said first terminal to the server; providing a recognition data to said first terminal; providing said recognition data to said second terminal; decoding said recognition data by said second terminal; providing to said server by said second terminal said decoded recognition data and a second identity, verifying by said server said decoded recognition data and providing a second data set to said second terminal; verifying the second data set by said second terminal; and execut- (Continued)

ing an event with respect to result of said verification of the second data set.

13 Claims, 3 Drawing Sheets

(51) Int. Cl.
 *H04L 29/06* (2006.01)
 *G06Q 20/38* (2012.01)
(52) U.S. Cl.
 CPC .............. *H04L 63/08* (2013.01); *H04L 63/18* (2013.01); *H04W 12/06* (2013.01)

(56) References Cited

U.S. PATENT DOCUMENTS

| | | | |
|---|---|---|---|
| 2010/0070759 A1* | 3/2010 | Leon Cobos et al. | 713/155 |
| 2011/0119190 A1* | 5/2011 | Mina | G06Q 20/12 705/44 |
| 2011/0231270 A1 | 9/2011 | Dykes | |
| 2011/0251892 A1* | 10/2011 | Laracey | G06Q 30/0253 705/14.51 |
| 2012/0150749 A1* | 6/2012 | Coppinger | G06Q 20/02 705/71 |
| 2013/0060697 A1 | 3/2013 | Martinez Elicegui | |

FOREIGN PATENT DOCUMENTS

| | | |
|---|---|---|
| WO | 2008089383 A2 | 7/2008 |
| WO | 2008090568 A2 | 7/2008 |
| WO | WO 2007092525 A3 * | 11/2008 ............. G06F 21/53 |
| WO | 2011110697 A1 | 9/2011 |

OTHER PUBLICATIONS

International Preliminary Report on Patentability from corresponding International Application No. PCT/SE2012/000167, dated Jan. 10, 2014.

* cited by examiner

METHOD AND ARRANGEMENT FOR AUTHORIZING A USER

TECHNICAL FIELD

The present invention relates to a method, device and system for enabling secure interaction between a user and a service provider in general, and secure transaction services in particular.

BACKGROUND

There are currently several methods for authorizing user and especially securing on-line transactions, such as transactions when selling, buying, transferring funds, online banking, etc.

Some of these methods rely upon one-time codes having previously been provided to a registered user. According to other methods for securing one-line transactions, each user is provided with his personalized code-generating device, whereby the user can, when appropriate, generate codes which can be used as, for example, passwords or digital signatures.

The code generating device (pin pad) may comprise a display and a numerical keypad. The user connects to the bank server using the browser, then uses the pin pad to prove her identity.

This scenario uses a bank as an example, but the procedure is applicable to any application where authentication is necessary, e.g., secure communication within a company or for VPN access.

This is a typical scenario, with the user's actions may comprise the steps of:
The user opens a browser to the server's (banks) address on her computer
The user enters her SSN or some other personal data to establish her identity
The server generates a random 8-digit number, called a challenge below, and shows it to the user
The user enters her secret four-digit PIN on her pin pad to unlock it
The user enters the 8-digit challenge on the pin pad
The pin pad encodes the challenge and displays the result as another 8-digit number, called the response
The user enters the 8-digit response in the web browser
The server now knows that the user is someone who both has possession of the pin pad and knows its PIN Using a mobile terminal, in the case of, for example, signing a transaction, a challenge code, generated by a transaction server system, is typically displayed to the user on the display of the terminal, such as an internet-connected computer or a mobile terminal. The user subsequently enters this challenge code in his code-generating device. Based on the entered code, the code-generating device generates a response code, a digital signature, which the user provides to the transaction server system through his communication device. If the digital signature can be verified by the transaction server system, the transaction is carried out.

Entering of such, often very long, codes into the code-generating device may, however, be seen as cumbersome by the user, which may motivate the transaction service provider to make a trade-off between security and ease-of-use which may, for example, involve limiting the complexity and/or occurrence of digital signature challenges. Hereby, the security level is decreased without achieving a truly user-friendly method for secure interaction.

SUMMARY OF THE INVENTION

According to the invention, visual codes such as barcodes are used to facilitate authentication of users and to perform actions such as signing documents or performing peer-to-peer transactions/payments.

For these reasons a method of activating a first mobile terminal and a second mobile terminal to operate with a server. The method performed by a processor of the mobile terminal, the method comprising:
 a. providing a first authentication data from said first terminal to the server;
 b. verifying said first authentication data;
 c. providing a first data set and a unique identity by said first terminal to the server;
 d. providing a recognition data to said first terminal;
 e. providing said recognition data to said second terminal;
 f. decoding said recognition data by said second terminal;
 g. providing to said server by said second terminal said decoded recognition data and a second identity;
 h. verifying by said server said decoded recognition data and providing a second data set to said second terminal;
 i. verifying the second data set by said second terminal; and
 j. activating said terminals with respect to result of said verification of the second data set.

Preferably, the first and second data sets are transaction data and said event is a transaction event. The first and second authentication data are a PIN code or a secret. In one embodiment, the recognition data is a visual image, which may be a bar code. In one embodiment, in step e. said recognition data is provided through image recording. Preferably, the first terminal is a seller terminal and said second terminal is a buyer terminal. The method may further comprise one or several steps of: entering a description of the transaction, entering a private description of the transaction, selecting a different transaction currency, or entering an alias for a user. The method may use encryption based on Public Key Infrastructure, PKI, where the server has a private key and every terminal has a corresponding public key and/or a SSL protocol for communication to and from the server.

The step a. may comprise: composing a message containing a unique identity of the terminal, a user identity and a secret code, adding a random data to the message, optional step of signing the message with a certificate, encrypting the message, erases user's secret code, decrypting the message in said server and comparing the secret code with one stored in a database, if the correct secret code, creating an application session having a unique identity and comprising information about a user and terminal identity.

Preferably, the recognition data generated by: generating a challenge number by said server and storing it in a local database along with a current time and information about a browser session; the challenge number being randomly generated; converting the challenge number to a short text string, and creating the recognition data in form of a barcode containing the text string.

In one embodiment the step h. comprises: verifying a challenge number and sends the second data set to the second terminal, validating by the server the supplied data to determine the terminal's identity and a user identity have been stored together in the database, the server looking up the challenge number in its database, and if the challenge number is valid, then creating a new application session for a second application transmitting session number to the second terminal.

In one embodiment the step i. comprises: Sending a secret, second data set to the server where the data is validated; composing a confirmation message containing the secret and the second data set, providing a random data to the message, encrypting the message using a server public key, sending the message over an secure connection to the server, decrypting the message and compares the secret in the message with the one stored, if correct secret, the server checking for an application session number to validate, and if the session is valid, additional control of the second data set.

Preferably, the server creates and provides a recognition data in form of a barcode containing a challenge, using a standard image tag for the challenge barcode in a HTML page, when the browser renders the HTML page, automatically sending an HTTPS GET request to the server for a URL in the tag.

The method, after step i., may comprise the step of effectuating or storing information about the event by said server.

The invention also relates to a communication terminal comprising a communication part, a controller and memory. The controller is configured to perform steps of the method executed in the communication terminal.

The invention also relates to a computer-readable medium comprising a plurality of computer-readable instructions for execution by a processor of a mobile terminal, wherein execution of the instructions causes the processor to perform of the steps of method executed in the communication terminal.

The invention also relates to a server comprising a processor, a memory, and a communication interface, wherein the server is configured to activate a mobile device to operate with the server, wherein the processor is configured to perform steps of the method to be performed in the server.

The invention also relates to a computer-readable medium comprising a plurality of computer-readable instructions for execution by a processor of a server, wherein execution of the instructions causes the processor to perform steps of the method to be performed in the server.

BRIEF DESCRIPTION OF THE DRAWINGS

Reference is made to the attached drawings, wherein elements having the same reference number designation may represent like elements throughout.

DETAILED DESCRIPTION

The following detailed description refers to the accompanying drawings. The same reference numbers in different drawings may identify the same or similar elements.

In the following the invention is described with reference to transactions made between a buyer, a seller and a transaction controller such as bank. However, the teachings of the invention may be applied to other fields, such as data encryption, data exchange, alarming facilities, etc.

Figure 1:
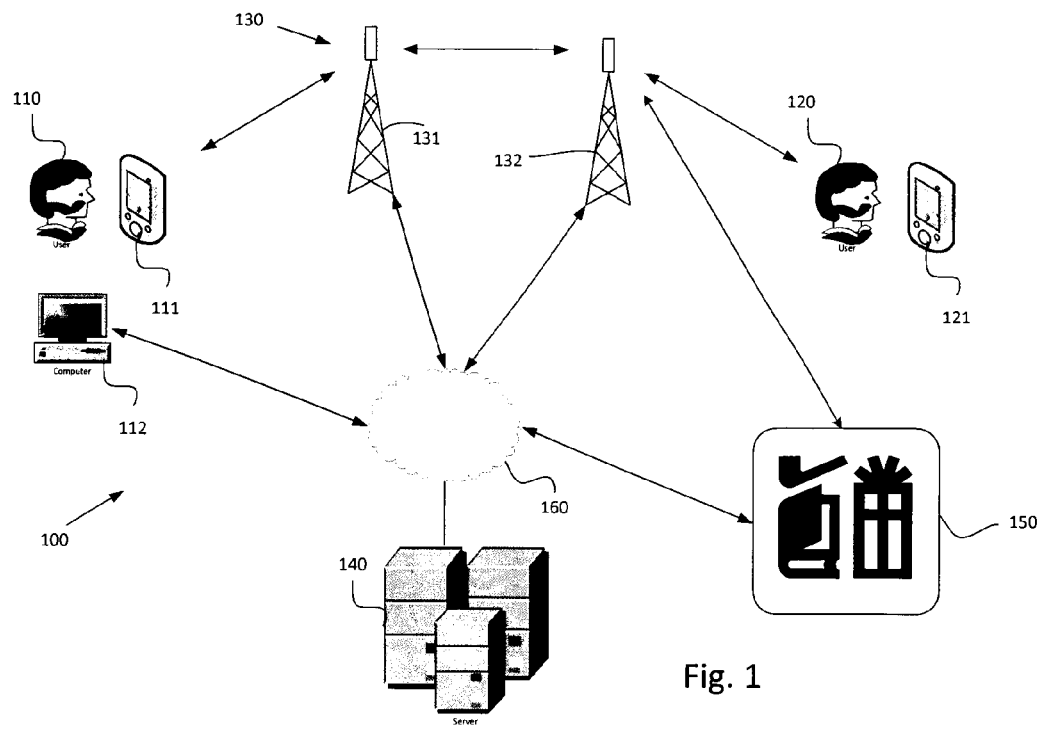
FIG. 1 is a diagram of an exemplary system in which methods and systems described herein may be implemented.

FIG. 1 illustrates a first embodiment of a transaction system 100 implementing the teachings of the invention. The system 100 involve a first user 110 having a mobile terminal 111, a computer 112, a second user 120 having a mobile terminal 121, a communication network 130 comprising a number of communication nodes 131 and 132, a transaction service provider server 140, a shop (physical or virtual) 150 and a second communication network 160.

The first communication network 130 may be a collection of terminals, links and nodes which connect to enable telecommunication between users of the terminals and configured in accordance with the Global System for Mobile Communication (GSM) and General Packet Radio Services (GPRS) standards. The GSM/GPRS wireless network is used worldwide and it is expected that these standards may be supplemented or superseded eventually by Enhanced Data GSM Environment (EDGE) and Universal Mobile Telecommunications Service (UMTS), and Ultra Mobile Broadband (UMB). Each terminal in the network has a unique address so messages or connections can be routed to the correct recipients. The communication network may further comprise of one or several of CSD, HSCSD, EDGE (EGPRS), Evolved EDGE (EGPRS2B), UTRA-FDD (W-CDMA), FOMA, UTRA-TDD, UTRA-TDD, HCR (TD-CDMA), UTRA-TDD LCR (TD-SCDMA), HSPA, HSDPA, HSUPA, DC-HSDPA, 3GPP(Pre-4G) Evolved HSPA (HSPA+; Rel. 7), Long Term Evolution, LTE Advanced (4G), CDMA2000 (evolutionary 3G), etc. However, new standards are still being defined, but it is believed that they will have similarities to the network behavior described herein, and it will also be understood by persons skilled in the art that the embodiments of the present disclosure are intended to use any other suitable standards that are developed in the future. The wireless link connecting communication subsystems with network 130 may represent one or more different Radio Frequency (RF) channels, operating according to defined protocols.

The mobile terminals 111 and 121 may be a two-way communication device with advanced data communication capabilities having the capability to communicate with other computer systems. A mobile terminal may also include the capability for voice communications. Depending on the functionality provided by a mobile terminal, it may be referred to as a data messaging device, a two-way pager, a cellular teleterminal with data messaging capabilities, a wireless Internet appliance, or a data communication device (with or without telephony capabilities), for example. A mobile terminal may communicate with other devices through a network of transceiver stations. In the following examples a mobile terminal is exemplified as mobile terminal.

Figure 2:
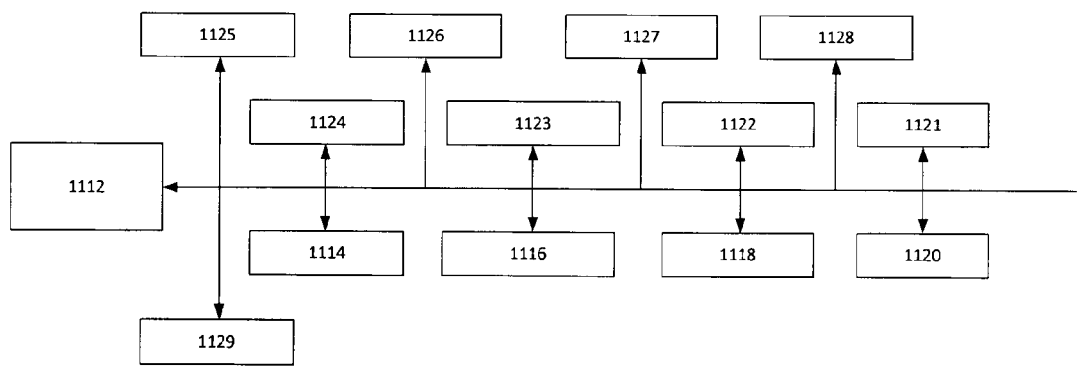
FIG. 2 illustrates a schematic view of a portable communication terminal according to one embodiment of the invention.

Referring first to FIG. 2, a block diagram of a mobile terminal in one example implementation is shown generally as 111 (also 112). Mobile terminal 111 comprises a number of components: a controller (microprocessor) 1112. Microprocessor 1112 controls the overall operation of mobile terminal 111. Communication functions, including data and voice communications, may be performed through a transceiver 1114. The transceiver 1114 may be configured to receive messages from and send messages to the wireless network 130. In one example implementation of mobile terminal 111, the transceiver 1114 may be configured in accordance with the above mentioned networks and standards.

Although the wireless network associated with the exemplary mobile terminal 111 of the present invention is a GSM/GPRS based wireless network, other wireless networks may also be associated with mobile terminal in variant implementations. Different types of wireless networks that may be employed include, for example, Wireless Local Network (WLAN), data-centric wireless networks, voice-centric wireless networks, and dual-mode networks that can support both voice and data communications over the same physical base stations.

The microprocessor 1112 may also interact with additional subsystems such as a Random Access Memory (RAM) 1116, flash memory 1118, display 1120, auxiliary input/output (I/O) subsystem 1121, serial port 1122, keyboard 1123, speaker 1124, microphone 1125, camera unit 1126, short-range communications subsystem 1127 and other device subsystems 1128.

Some of the subsystems of mobile terminal 111 perform communication-related functions, whereas other subsystems may provide "resident" or on-device functions. By way of example, display 1120 and keyboard 1123 may be used for both communication-related functions, such as entering a text message for transmission over network, as well as device-resident functions such as a calculator or task list. Operating system software used by microprocessor 1112 is typically stored in a persistent store such as flash memory 1118, which may alternatively be a read-only memory (ROM) or similar storage element (not shown). Those skilled in the art will understand that the operating system, specific device applications, or parts thereof, may be temporarily loaded into a volatile store such as RAM 1116.

The mobile terminal 111 may send and receive communication signals over the network after network registration or activation procedures have been completed. Network access may be associated with a subscriber or user of a mobile terminal 111. To identify a subscriber, mobile terminal 111 may provide for a Subscriber Identity Module ("SIM") card 1129 (or e.g. USIM for UMTS, or CSIM or RUIM for CDMA) to be inserted in a SIM interface in order to communicate with a network. SIM 1129 may be one example type of a conventional "smart card" used to identify a subscriber of mobile terminal 111 and to personalize the mobile terminal 111, among other things. Using the terminal a subscriber may access all subscribed services, such as, without limitation: web browsing and messaging such as e-mail, voice mail, Short Message Service (SMS), and Multimedia Messaging Services (MMS). More advanced services may include, without limitation: point of sale, field service and sales force automation. In order to identify the subscriber, SIM 1129 may contain some user parameters such as an International Mobile Subscriber Identity (IMSI).

The microprocessor 1112, in addition to its operating system functions, enables execution of software applications on mobile terminal 111. A set of applications that control basic device operations, including data and voice communication applications, may be installed on mobile terminal 111 during its manufacture. Another application that may be loaded onto mobile terminal 111 is a Personal Information Manager (PIM). A PIM may have functionality to organize and manage data items of interest to a subscriber, such as, but not limited to, e-mail, calendar events, voice mails, appointments, and task items. A PIM application may have the ability to send and receive data items via the wireless networks. The short-range communications subsystem 1127 may provide for communication between mobile terminal 111 and different systems or devices, without the use of network 130. Examples of short-range communication may include Infrared (IR), Bluetooth, and the 802.11 family of standards (Wi-Fi).

In use, a received signal such as a text message, an e-mail message, or web page download may be processed by communication subsystem 1114 and input to microprocessor 1112. Microprocessor 1112 then processes the received signal for output to display 1120 or alternatively to auxiliary I/O subsystem 1121. A subscriber may also compose data items, such as e-mail messages, for example, using keyboard 1123 in conjunction with display 1120 and possibly auxiliary I/O subsystem 1121. Auxiliary I/O subsystem 1121 may include devices such as: a touch screen, mouse, track ball, infrared fingerprint detector, or a roller wheel with dynamic button pressing capability. Keyboard may comprise an alphanumeric keyboard and/or teleterminal-type keypad, for example. A composed item may be transmitted over network through communication subsystem 1114.

For voice communications, the overall operation of mobile terminal 111 may be substantially similar, except that the received signals may be processed and output to speaker 1124, and signals for transmission may be generated by a terminal. Alternative voice or audio I/O subsystems, such as a voice message recording subsystem, may also be implemented on mobile terminal 111. Although voice or audio signal output may be accomplished primarily through speaker 1124, display 1120 may also be used to provide additional information such as the identity of a calling party, duration of a voice call, or other voice call related information.

The communication network 160 may be computer network, e.g. based on Internet Protocol (IP), such as Internet, Intranet, TCP based, wireless (RF, IR, light), cable based or the like, The server 140 is a computer comprising a processing unit, memory, data storage, communication interfaces provided on the Internet. It could, for example, be a web server for a bank.

In the following description, some entities are defined generally:

The user is someone who wants to identify herself to the server, e.g., to pay a bill via the server An attacker is someone who wants to gain access to the information passing between the user and the server.

A buyer is a user who wants to make a payment via a terminal.

A seller is a user who wants to receive a payment via the mobile terminal.

An alias is a name that a user may use during transactions. It does not have to be her real name.

A browser is an application for accessing the web running on the user's computer.

A pin pad is a small device with a numerical keypad, a display and a secret key.

A PIN code is a short, secret code that only the user knows. It is usually four digits.

An application (app) is here a piece of custom software that runs on the user's terminal.

A setting is a piece of information stored in the app, e.g., the user's name or SSN. Every instance of the app has its own settings.

In the following examples, a barcode generally refers to a visual representation of data. For example, a typical "1-dimensional" barcode may be represented by a series of lines of varying widths and spacing. As a further example, a "2-dimensional" barcode may be represented by squares, dots, hexagons or other geometric patterns. One example of 2-dimensional barcode is Quick Response (QR) code. A barcode may be a black-and-white barcode. Alternatively, a barcode may be a color barcode.

A browser session is a connection between the browser and the server.

An app session is a connection between the app and the server, in effect a series of messages identified by a common session number.

Figure 3:
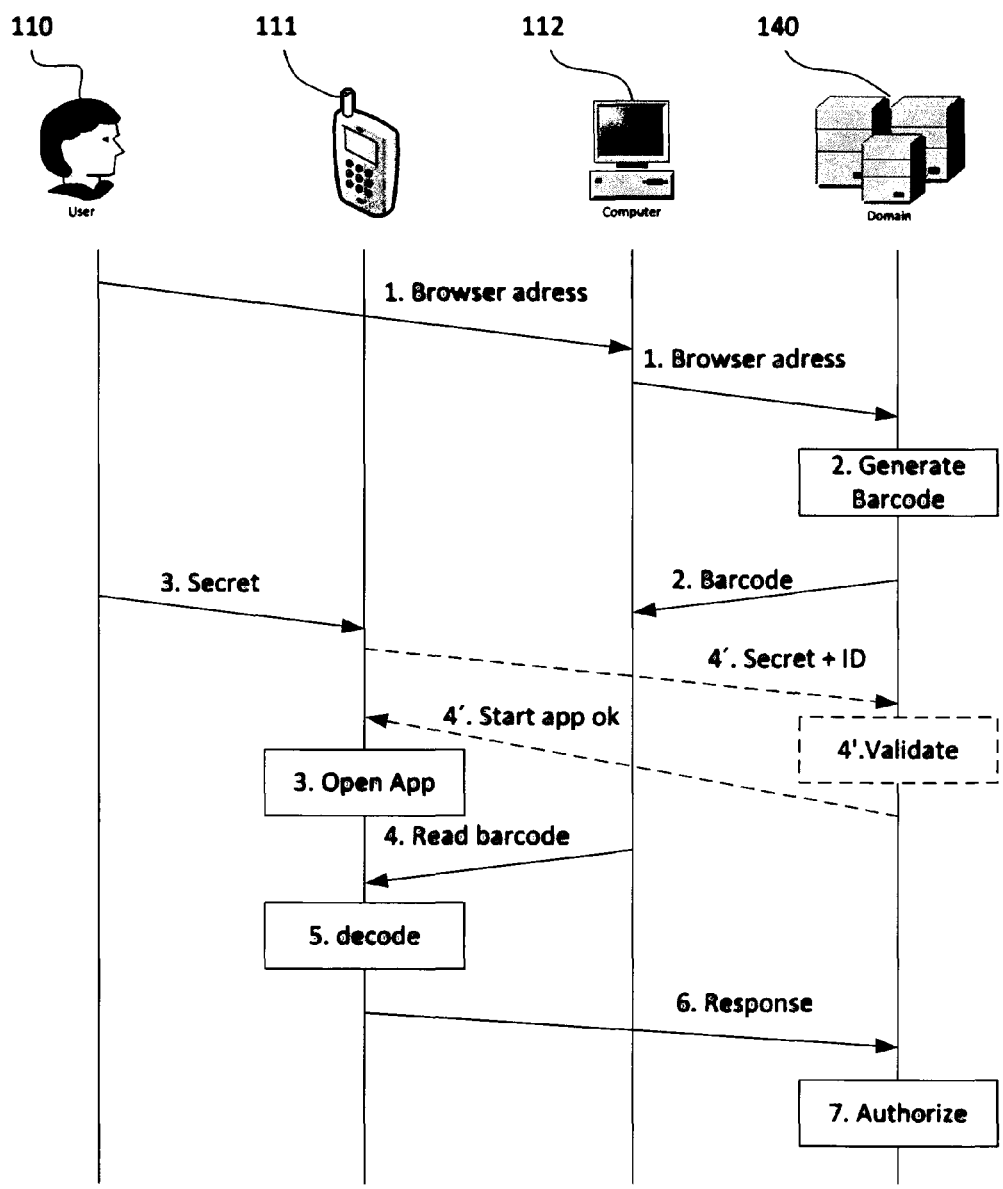
FIG. 3 is a flow diagram illustrating one exemplary processing in the system of FIG. 1.

Referring now to FIG. 3 (in conjunction with FIG. 1), illustrating one embodiment of the invention, with the use of barcodes, for example QR codes, and a mobile terminal connected to the Internet, the process of authentication for a transaction can be made much easier for the user:

1. The user 110 may open a browser to the server's 140 (address) on a computer device 112.
2. The server 140 generates a barcode containing a random number, called a challenge, and provides it to the user through the computer device 112.
3. The user 110 enters a secret, e.g. four-digit PIN or password, in an application program (app) running on the mobile terminal 111 to unlock the app.
4. In next step the user simply holds the terminal 111 with the camera facing the barcode in the web browser on the display of the computer 112.
5. The app reads the barcode through the camera's video feed and decodes it to extract the challenge from the server.
6. The app creates and sends a response containing the terminals unique identity and the challenge back to the server 140.
7. The server now knows that the browser is used by someone who both has possession of the terminal and knows the app's PIN.

In the scenario described in the background part, called the pin pad scenario, the user had to enter a total of 30 digits, on two different devices (her 10-digit SSN, the 4-digit PIN, the 8-digit challenge and the 8-digit response). 16 of these digits, the challenge and the response, had to be read from one device and entered on the other.

In the scenario according to the present invention, the authentication scenario, the user need to enter a memorized 4-digit PIN code. This is a dramatic difference, especially for people not good with numbers, such as elderly users.

In one embodiment the PIN code or secret can be stored on the server rather than on the mobile terminal. Here is the authentication scenario again, with an extra step added after step 3 (dashed lines in FIG. 3):

4'. The app sends the PIN/secret together with the terminals unique identity to the server, where they are validated and an app session is started This way, the security is arguably stronger in the authentication scenario than in the pin pad scenario:
  There is no way to extract the PIN from the terminal, since it is not stored there
  If the server automatically blocks the terminal after a number of incorrect PIN attempts have been made, there is no way for an attacker to use brute force to get the PIN even if he has a terminal that mimics the identity of the user's terminal Note also that this does not make the process any more difficult for the user. The extra step is only noticeable as a short delay while the PIN is transmitted to the server and validated.

If an "attacker" in some way is able to scan the barcode before the user, the only effect would be that the browser window would be logged into the attacker's account.

Pairing the Mobile Terminal and the User

For applications requiring high security, such as for banking, a login with username and password is not enough. According to this embodiment, the security is improved by letting a user to "pair" a terminal using a barcode. In this embodiment, only devices explicitly paired to the user are allowed to access the user's account, even if the correct, e.g. Social Security Number (SSN) and PIN are entered.

The basic concept is to allow this pairing only when the user is securely identified, for example while logged in using a regular pin pad or at the bank where a bank employee can check the user's identity before allowing her to pair the terminal.

Pairing Using a Pin Pad

This variation of the scenario assumes that the user already owns a pin pad issued by the bank.

1. The user opens a browser on her computer and logs into the bank server using her pin pad. This connection is trusted enough that the user is allowed to see her account balance and history and to make transactions.
2. The user downloads, installs and starts the "app" on her mobile terminal
3. The user navigates to a pairing web page within the bank site. This page contains a challenge barcode. The procedure for generating and showing a barcode based challenge is described in the below (section "Creating a Challenge Barcode"). The page may also contain a script that establishes, e.g. a Hypertext Transfer Protocol Secure (HTTPS) based Asynchronous JavaScript and XML (AJAX) connection to the server.
4. The user scans the challenge barcode with the mobile terminal.
5. The app decodes the challenge number in the barcode and sends it, along with the terminal's unique identity number, to the server.
6. The server verifies that the challenge number is valid and then records the terminal's identity together with the user name in a temporary area.
7. The server sends back a success message to the app.
8. The app now asks the user to select and enter a PIN code or password (secret).
9. The user enters her PIN code on the mobile terminal.
10. The app sends the PIN code to the server.
11. The server returns a message saying that the PIN has been received.
12. The app erases the PIN from memory and directs the user to go back to her browser.
13. (optional) It is common practice to have users enter PIN codes and passwords twice the first time, to protect against typing mistakes. To strengthen the security, the user can be asked to verify the PIN code on the browser instead of in the app. This protects against attackers scanning the barcode before the user, but may compromise the PIN code if the user's PC contains malicious keylogger software:
   13.1. The server sends a response to the browser over the AJAX connection
   13.2. The script shows a dialog asking the user to enter her PIN code again
   13.3. The user enters her PIN in the dialog
   13.4. The script sends the PIN to the server
   13.5. The server validates that the two PIN codes (one from the app and one from the browser) are identical
14. The server stores the user's identity, the terminal's identity and the PIN code in the database.
15. (optional) For increased security, the server can now generate a certificate for the app. This is a standard procedure, where the app generates a key pair, and sends the public key to the server where it is signed with the server's private key. The certificate contains the public key, the signature and optionally other information such as an identifier for the user or even the terminal identity (but this is potentially unsecure). The private key and the certificate are stored in the mobile terminal by the app and can be used to encrypt and sign future communication from the app to the server.

16. (optional) To verify the connection, the server may send a random number to both the browser and the app. The user checks that the two numbers are identical and confirms this in both the browser and the app.

To protect against attackers scanning the barcode before the user to gain access to the account, the server must make sure that it doesn't receive the challenge twice from different devices. Other checks to make, may include stopping the procedure immediately if the user leaves or closes the browser page and checking the time elapsed while the user selects and enters her PIN, to make sure that at least a few seconds have elapsed.

Pairing at the Bank

A simpler procedure can be used if the user is present in a bank office or any place where a bank representative has a browser with a secure connection to the server:

1. The bank representative verifies the user's identity and makes sure that no attackers can see the screen.
2. The representative or the user downloads, installs and starts the app on the user's mobile terminal.
3. The bank representative requests a challenge barcode using a browser or custom application on her PC. The procedure for generating and showing a barcode challenge is described below ("Creating a Challenge Barcode").
4. The bank representative or the user scans the challenge barcode with the mobile terminal app.
5. The flow continues as for the "Pairing using a pin pad".

Because security at the bank office is higher, some of the manual verification steps may be eliminated in this way, so that all a user has to do is to enter her PIN.

According to one aspect of the invention, the technical foundation for the security may be based on PKI, Public Key Infrastructure, where the server has a private key and every app has a corresponding public key. Anything encrypted with one key is only readable with the other. In addition, HTTPS or another Secure Sockets Layer (SSL) protocol is used for all communication to and from the server. According to this embodiment, regular HTTPS is assumed, but it is possible to increase security even more by issuing unique certificates to each app instance (i.e., every terminal that runs the app has a different certificate).

Below is a detailed description of all the steps in the authentication.

the User Opens the Browser to the Server's Address on her Computer

This is done using HTTPS and a trusted server certificate, in the standardized way. This solution authenticates the server to the browser, so the browser now knows that it is communicating with the server and not an impostor. Browsers generally indicate this to the users as well, so our user knows that she is communicating with the bank.

The Server Generates Barcode Containing a Random Number, Called a Challenge, and Shows the Barcode to the User In the pin pad scenario, the user had to enter her SSN or some other unique identifier here. This is not necessary anymore, since the app will send this information in a later step.

The procedure for generating and showing a barcode based challenge is described in "Creating a Challenge Barcode" below.

the User Enters her Secret Four-Digit PIN in an "App" on her Mobile Terminal

The user picks up her mobile terminal, starts the app and enters her personal identification number.

the App Sends the PIN Together with the Terminal's Unique Identity to the Server, where they are Validated and an App Session is Started In contrast to the pin pad scenario, the app does not have access to the correct PIN.

Instead, it constructs a message in this way:

1. The app constructs a basic message containing the terminal's unique identity, the user's identity (stored in the app's settings) and the PIN code.
2. The app adds salt (random data) to the message to improve security.
3. Optional: If the app has a certificate issued by the server, the message is signed with this certificate.
4. The app encrypts the message using the server's public key. Now only the server can read the message.
5. As soon as the message is encrypted, the app erases the user's PIN from memory.
6. The message is transmitted over the HTTPS connection to the server.
7. The server decrypts the message and compares the PIN with the one stored in the database for the user. The server may also look at the terminal identity to make sure it matches one of the user's registered mobile terminals.
8. If the PIN was correct, the server creates an app session. The app session is given a unique number and also holds information about the user and terminal identities.
9. The server sends back a signed message informing whether the PIN was correct or not. If the user has made too many incorrect tries, the server locks the account until the user revalidates her identity by pairing the terminal again. If the PIN was correct, the message also contains the app session number.
10. The app reads the signed message and if the PIN was correct it displays a scanning screen.

The user simply holds her terminal with the camera facing the barcode in the web browser the App Reads the Barcode Through the Camera's Video Feed and Decodes it to Find the Challenge The first step, reading the barcode, is a standard process. The app takes a snapshot of what the camera sees and looks for barcodes in the picture. If no barcodes are found, it takes another snapshot and repeats the process.

When a barcode is detected, it is decoded and contents of it, the challenge, is revealed. If no barcode is found within a set time, the app can lock itself again to ensure that no attacker can use it if the user leaves the terminal unattended.

The app creates and sends a response containing the challenge and the app session number back to the server:

1. The app assembles a response message containing the challenge and the app session number, encrypts it with the server's public key and transmits it over, e.g. HTTPS connection, to the server.
2. The server first checks the app session number to make sure that it is valid. These app sessions should not need to last for more than a few minutes, so they can time out quickly.
3. Assuming that the app session is valid, the server looks up the challenge number in its database. Challenge numbers should have a longer life than app sessions, (to give the user enough time to find her mobile terminal, start the app, enter her PIN and scan the barcode).

4. If the challenge number is also valid, then the login is a success.

The server now knows that the user is someone who both has possession of the terminal and knows the app's PIN.

The app session number identifies the user and the challenge number identifies the browser session, so the server finally knows which user has scanned the barcode in the browser window.

With this information, the server can safely consider the browser session to be logged into the user's account. Using standard web technologies like AJAX, the server can immediately update the contents of the browser window to show the user's account data.

The server can also send a success message back to the app and then immediately terminate the app session. The app can then re-lock itself and display a success message to the user.

Digital Signature Using a Mobile Terminal

A variation on the authentication scenario above can be used to sign transactions. Let us assume that the user has logged into bank and created a few transactions. When it is time to sign the transactions, the same sequence as above can be used:

1. The user navigates to the "signature" web page on the browser on her computer
2. The server generates barcode containing a random challenge number and shows the barcode to the user
3. The user enters her secret four-digit PIN in the app on her mobile terminal
4. The app sends the PIN together with the terminal's unique identity to the server, where they are validated and a new app session is started
5. The user scans the barcode with the app
6. The app reads the barcode through the camera's video feed and decodes it to find the challenge
7. The app creates and sends a response containing the challenge and the new app session number back to the server.
8. The server verifies the response, records the signature and completes the transactions The only parts of this scenario, the sign scenario, that are different from the authentication scenario are the first and last steps.

In the first step, the user is already logged in but navigates to a special web page within the server's site.

In the last step, the server can make the following validation checks:

Validate the app session
Validate the challenge number
Make sure that the app session user is the same as the browser session's user.

For more advanced transactions, e.g. in companies that require several people to sign for expenses, this approach may become even more convenient. Each of the users can scan the same tag, to sign the transaction independently of each other. In this case, there would only be one browser session, for the originating user, but each signer would have a separate app session and each signature would be recorded separately.

Distributed Co-Signing of Transactions

A variation of the sign scenario can be used when a transaction must be signed by several users, for example not located at the same place.

1. A user logs in and creates a transaction that requires several signatures to complete.
2. The user navigates to the "signature" web page.
3. The server generates barcode containing a random challenge number and provides the barcode to the user. This particular challenge number is marked in the database as a co-signing challenge, which may change the expiration time from a few minutes to several days or weeks.
4. The user copies the barcode image and sends it to each of the signers via e.g. mail, printed copies or even via fax.
5. Each signer starts the app, enters PIN code/password/secret and scans the barcode.
6. The server sees that this is a co-signing challenge and sends all information about the transaction back to the signer. The app session is not terminated immediately for co-signing challenges.
7. The signer reviews the transaction, and if she agrees to the transaction she signs it by entering her PIN code a second time.
8. The app sends the PIN, challenge and app session number to the server.
9. The server validates everything and records the signature. If this was the last needed signature, the server completes the transaction.

The present invention may be used for transactions between two users, e.g. a buyer and a seller.

Figure 4:
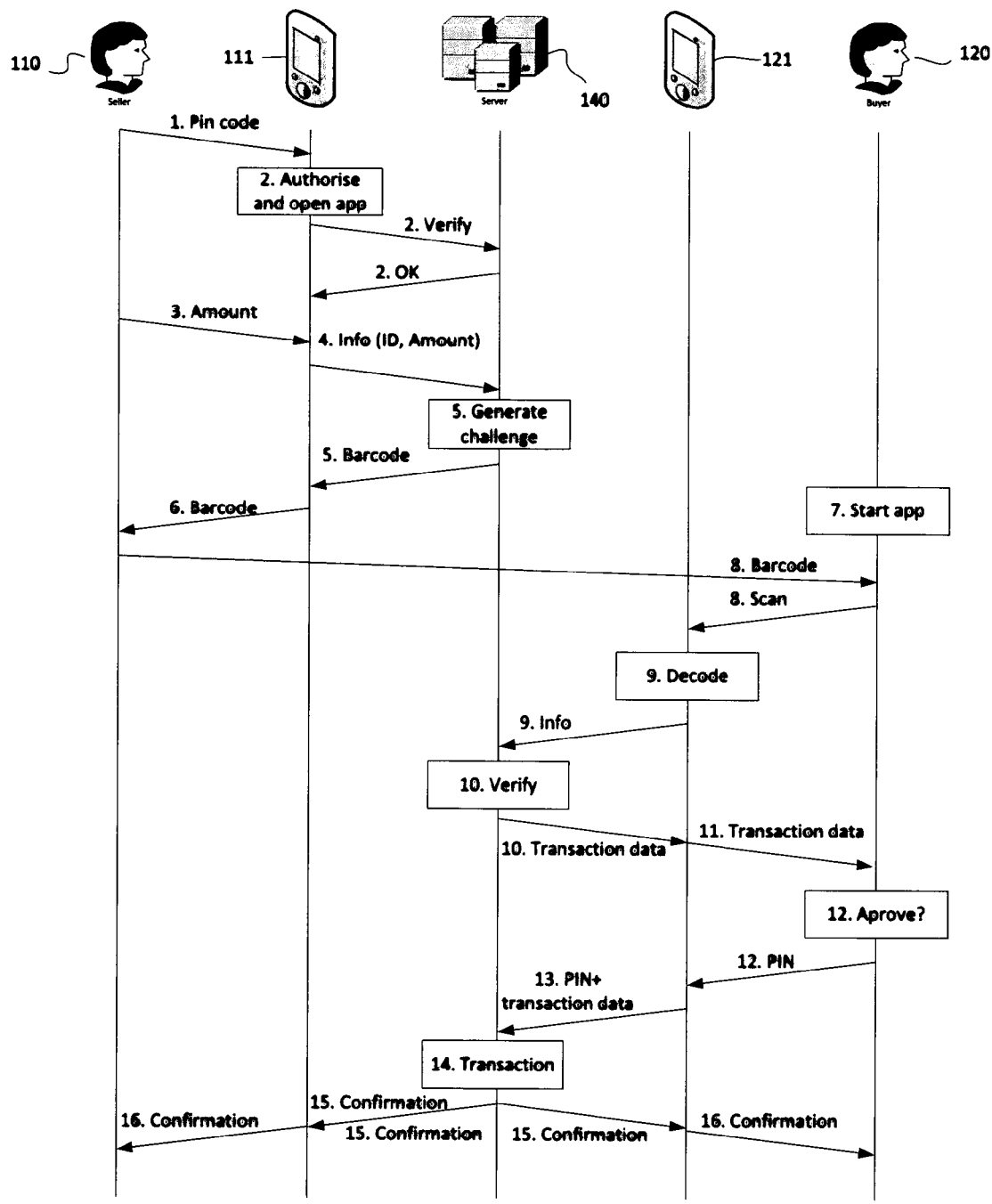
FIG. 4 is a flow diagram illustrating a second exemplary processing in the system of FIG. 1.

Referring back to FIG. 1, we assume that user 110 is a seller and user 120 is a buyer and that both the buyer and the seller are assumed to have mobile terminals 111 and 121 respectively, running an application according to the invention. They are also assumed to have connected the app to their accounts on the server 140, and may have entered aliases in the app and to have obtained (determined) secret PIN codes/secrets. Following is the basic flow for performing a "peer-to-peer" payment (FIG. 4):

1. The seller starts the app on her mobile terminal and enters her PIN to unlock it.
2. The seller's app verifies the PIN with the server and then may erase it from memory.
3. The seller enters the amount he wishes to receive and optionally a short text or other information describing the transaction.
4. The seller's app sends the seller's identity, the terminal's unique identity and the entered information to the server.
5. The server generates a barcode containing a random number, called a challenge below, and sends it to the seller's app.
6. The seller's app displays the barcode on the mobile terminal's screen.
7. The buyer starts the app on her mobile terminal.
8. The buyer scans the barcode on the seller's mobile terminal with the app.
9. The buyer's app decodes the barcode to recover the challenge number and sends it, together with the buyer's identity and alias to the server.
10. The server verifies the challenge number and sends the transaction data (transaction ID, currency, amount, seller's alias and the optional transaction description) to the buyer's app.
11. The buyer's app displays the transaction data on the screen.
12. The buyer reviews the transaction data and, if approves, signs it by entering PIN.
13. The buyer's app sends the PIN, the transaction ID and the terminal's unique identity to the server where the data is validated. The buyer's app then may erase the PIN from memory.

14. The server records the transaction and transfers the specified amount from the buyer's to the seller's account.
15. The server sends a confirmation to both the seller's and the buyer's app.
16. Both apps show the confirmation on the screen There are several details to be noted here:

The transaction is made very simple by the use of the barcode. The seller only enters her PIN and the amount, and the buyer only scans the barcode and enters her PIN.

The users' PIN codes are stored on the server, not on the mobile terminals. This ensures that an attacker cannot access the accounts even if she manages to steal the terminal and read its data.

The buyer doesn't enter her PIN until she has verified and approved the transaction details. Thus, if she doesn't approve or feels unsafe she can just cancel the transaction. This reduces the risk that someone else sees her PIN.

The embodiment may be detailed with several optional steps:

1. The seller starts the app on her mobile terminal and enters her PIN to unlock it
2. The seller's app verifies the PIN with the server and then erases it from memory
3. The seller enters the amount he wishes to receive
4. (Optional) The seller may enter a description of the transaction or sale to be shown on the buyer's screen
5. (Optional) The seller may enter a private description of the transaction to appear only on her own account statement.
6. (Optional) The seller may select a different currency that her account's currency. In this case, the app should ask the server for the current exchange rate and shows that to the seller and/or show the entered amount in both currencies.
7. (Optional) The seller may enter an alias to be used for just this transaction
8. The seller's app sends the seller's identity, the terminal's unique identity and the entered information to the server
9. The server generates a barcode containing a random number, called a challenge below, and sends it to the seller's app
10. The seller's app displays the barcode on the mobile terminal's screen
11. The buyer starts the app on her mobile terminal
12. The buyer scans the barcode directly from the seller's mobile terminal with the app
13. The buyer's app decodes the barcode to recover the challenge number and sends it, together with the buyer's identity and alias to the server
14. The server verifies the challenge number and sends the transaction data (transaction ID, currency, amount, seller's alias and the optional transaction description) to the buyer's app
15. (Optional) if the buyer's account's currency is different from the transaction currency, the server may recalculate the amount into the buyer's currency and send both amounts to the buyer's app (it is important to show both amounts, because the buyer and seller have probably agreed on a price in the transaction currency)
16. The buyer's app displays the transaction data on the screen
17. (Optional) The buyer may enter a private description of the transaction to appear on her own account statement
18. (Optional) The buyer may enter an alias to be used for just this transaction
19. The buyer reviews the transaction data and, if she approves, signs it by entering her PIN
20. The buyer's app sends the PIN, the transaction ID and the terminal's unique identity to the server where the data is validated. The buyer's app then erases the PIN from memory
21. The server records the transaction and transfers the specified amount from the buyer's to the seller's account. The account statements for each party may only show the other party's alias, not their real identities.
22. The server sends a confirmation to both the seller's and the buyer's app.
23. Both apps show the confirmation on the screen The advantages of the detailed embodiments comprise:

The buyer and seller are anonymous to each other. They will see each other's aliases, but the real identities are only known to the server. However, to settle disputes or for legal reasons it may be necessary to reveal their real identities.

The buyer and seller can use different currencies. They can even use a third currency for the transaction. For example, they may have agreed on the price of 10 GBP even though the buyer's account uses USD and the seller's uses Euro. In this case, of course, both users may have to pay currency exchange fees as determined by the bank (i.e., the buyer pays slightly more than 10 GPB in her currency and the seller receives slightly less than 10 GBP in her currency).

The complexity of the app setup depends on the bank and the user requirements. Many banks issue "pin pads" that are used to identify users, while other banks just use an email address and password as identification.

Regardless of this, the basic flow of the app setup is the same:

1. The user downloads, installs and starts the app
2. (Optional) if the user does not already have an account with the bank, the app may let her create one
3. The user identifies herself to the server through the app in the same way as would be used for a regular web browser (i.e., with email and password, by using a pin pad or by some other method)
4. The app asks the user to select a PIN code and then sends the code to the server
5. The server stores the terminal's unique identity and the user's identity together with the PIN code.
6. (Optional) For increased security, the server can now generate a certificate for the app. This is a standard procedure, where the app generates a key pair and sends the public key to the server where it is signed with the server's private key. The certificate contains the public key, the signature and optionally other information such as an identifier for the user or even the terminal identity (but this is potentially unsecure). The private key and the certificate are stored in the mobile terminal by the app and can be used to encrypt and sign future communication from the app to the server
7. (Optional) The user may now enter a default alias to be used for transactions.
8. The app stores the user's identity and optionally the certificate and alias in its settings.

The technical foundation for the security may be based on PKI, Public Key Infrastructure, where the server has a private key and every app has the corresponding public key. Anything encrypted with one key is only readable with the other. In addition, HTTPS or another SSL protocol is used for all communication to and from the server. This description will assume regular HTTPS, but it is possible to increase security even more by issuing unique certificates to each app instance (i.e., every terminal that runs the app has a different certificate).

Below is a detailed description of some of the steps in the complete scenario:

The seller's app verifies the PIN with the server and then erases it from memory The app does not have access to the correct PIN. Instead, it constructs a message in this way:
1. The app composes a basic message containing the terminal's unique identity, the seller's identity (stored in the app's settings) and the PIN code
2. The app adds salt (random data) to the message to improve security
3. (Optional) If the app has a certificate issued by the server, the message is signed with this certificate.
4. The app encrypts the message using the server's public key. Now only the server can read the message.
5. As soon as the message is encrypted, the app erases the user's PIN from memory
6. The message is transmitted over the HTTPS connection to the server
7. The server decrypts the message and compares the PIN with the one stored in the database for the user. The server may also look at the terminal identity to make sure it matches one of the user's registered mobile terminals.
8. If the PIN was correct, the server creates an app session. The app session is given a unique number and also holds information about the user and terminal identities.
9. The server sends back a signed message informing whether the PIN was correct or not. If the user has made too many incorrect tries, the server locks the account until the user revalidates her identity by pairing the terminal again. If the PIN was correct, the message also contains the app session number.
10. The app reads the signed message and if the PIN was correct it shows a screen where the seller may enter transaction data.

The seller's app sends the seller's identity, the terminal's unique identity and the entered information to the server:
1. The app constructs a message containing the transaction data, and the seller app session number.
2. The app sends the message securely over the HTTPS connection.
3. The server validates all data, especially that the app session number is still valid.
4. The server generates a temporary transaction ID
5. The server then stores the data in a temporary area The server generates a barcode containing a random number, a challenge, and sends it to the seller's app.

The barcode may be constructed in the following way:
1. The server generates a challenge number and stores it in a local database along with the current time and information about the browser session (the IP number etc). The challenge number can be randomly generated (it must at least be hard to guess for an attacker). Also, the number must be checked so that it does not already exist in the database. Old challenge numbers should be purged from the database periodically.
2. The challenge number is converted to a short text string, for example by base64 encoding.
3. The server creates a barcode containing the text string. This process is standardized, and the finished barcode is a normal image file, e.g., a PNG file.
4. The server sends the barcode and the transaction ID back to the seller's app The seller's app displays the barcode on the mobile terminal's screen:

The barcode is displayed like any other image. It should be as large as the screen allows, making it easier to scan.

The buyer scans the barcode directly from the seller's mobile terminal with the app:

The buyer simply holds the terminal with the camera facing the barcode on the seller's mobile terminal. There is no need for the user to press any buttons to scan.

The buyer's app decodes the barcode to recover the challenge number and sends it, together with the buyer's identity and alias to the server:

Reading the barcode is a standard process. The app takes a snapshot of what the camera sees and looks for barcodes in the picture. If no barcodes are found, it takes another snapshot and repeats the process.

When the app finds a barcode, it is decoded and the contents of it, the challenge, is revealed:
a) The app constructs a query message containing the challenge number, the buyer's identity and the terminal's unique identity
b) If certificates are used, the data is signed with the app's certificate
c) The app sends the message over an HTTPS connection to the server The server verifies the challenge number and sends the transaction data (transaction ID, currency, amount, seller's alias and the optional transaction description) to the buyer's app:
1. The server validates the supplied data to make sure that the terminal's identity and the buyer's identity have been stored together in the database. If certificates are used, the signature is validated
2. Assuming the data is valid, the server looks up the challenge number in its database. Challenge numbers should time out after a fairly short time perhaps 5 minutes (to give the buyer enough time to find her mobile terminal, start the app and scan the barcode). There should be an easy way for the seller to generate a new barcode if the old one has timed out. For example, the app could keep track of the time, hide the barcode after a set time and show a button instead. If the seller presses the button, a new barcode is generated and shown.
3. If the challenge number is also valid, then the server creates a new app session for the buyer's app. The app session number is transmitted to the app together with the sender's alias The buyer's app sends the PIN, the transaction ID and the terminal's unique identity to the server where the data is validated. The buyer's app then erases the PIN from memory:
1. The app constructs a confirm message containing the PIN, the buyer app session number, the transaction identity, the buyer's identity and the terminal's unique identity
2. The app adds salt (random data) to the message to improve security
3. (Optional) If the app has a certificate issued by the server, the message is signed with this certificate.
4. The app encrypts the message using the server's public key. Now only the server can read the message.
5. As soon as the message is encrypted, the app erases the user's PIN from memory
6. The app sends the message over an HTTPS connection to the server.
7. The server decrypts the message and compares the PIN with the one stored in the database for the user. The server may also look at the terminal identity to make sure it matches one of the user's registered mobile terminals.
8. If the PIN was correct, the server checks the app session number to make sure that it is valid. These app sessions should not need to last for more than a few minutes, so they can time out quickly, say after ten minutes.
9. If the session was valid, the server double checks the transaction, buyer and terminal identities to make sure they match up with the data in the temporary storage area.

"Creating a Challenge Barcode"

According to one embodiment the server can create and show a barcode containing a challenge and pass show it in the user's browser.

In the HTML page there is a standard image tag for the challenge barcode:

<img src="https://bank.example.com/qr/challenge.png"/>

When the browser renders the HTML page, it will automatically send an HTTPS GET request to the server for the URL in the tag.

The barcode is constructed in the following way:
1. The server generates a challenge number and stores it in a local database along with the current time and information about the browser session (the IP number etc.). The challenge number can be randomly generated (it must at least be hard to guess for an attacker). Also, the number must be checked so that it does not already exist in the database. Old challenge numbers should be purged from the database periodically.
2. The challenge number is converted to a short text string, for example by base64 encoding.
3. The server creates a barcode containing the number. This process is standardized, and the finished barcode is a normal image file, e.g., a Portable Network Graphics (PNG) file.

The server sends the barcode to the browser over the HTTPS connection, and the browser displays the image on the user's screen.

As an extra precaution, the server could also check that only one challenge barcode at a time is in effect for a particular browser session. Another way of strengthening this process slightly is to have a random name for the bar image file, so rather than "challenge.png", it could be called "s34HjDu8.png". The server could then validate the image name in the HTTPS request to make sure it matches the one generated on the HTML page.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented at least in part by means of both hardware and software, and that several "means", "units" or "devices" may be represented by the same item of hardware.

The various embodiments of the present invention described herein is described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments of the present invention can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

The foregoing description of embodiments of the present invention, have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. A method of executing a peer-to-peer transaction between a first mobile terminal of a seller and a second mobile terminal of a buyer, the method comprising:
  receiving a first authentication data by a server from said first terminal using a first dedicated application;
  verifying, by said server, said first authentication data;
  in response to said server verifying said first authentication data, erasing, by said first terminal using said first dedicated application, said first authentication data from a memory of said first terminal;
  providing a first data set comprising a transaction data and a unique identity of the first terminal by said first terminal to the server;
  generating and providing a recognition data, not including the transaction data, by said server to said first terminal, wherein the recognition data includes a randomly generated challenge number that is stored in a local database together with a current time and information about a browser session of the server, the challenge number being converted to a short text string in said server, and the recognition data comprises a barcode containing the text string before providing to said first terminal;
  transferring said recognition data to said second terminal from said first terminal;

decoding said recognition data by said second terminal using a second dedicated application;
providing said server by said second terminal said decoded recognition data and a second identity;
verifying by said server said decoded recognition data and, based on verification of said decoded recognition data, providing a second data set comprising a transaction information to said second terminal;
verifying the second data set by said buyer;
based on verification of said second data set, accepting the transaction by receiving a second authentication data by said second terminal via the dedicated application in said second terminal; and
verifying, by said server, the second authentication data by comparing it with authentication data stored in the server;
in response to said server verifying said second authentication data, performing, by said server, a transaction; and
in response to said server verifying said second authentication data, erasing, by said second terminal using said second dedicated application, the second authentication data from a memory of said second terminal.

2. The method of claim 1, wherein said execution results in a transaction event.

3. The method of claim 1, wherein said first authentication data comprises a PIN code.

4. The method of claim 1, wherein in said step of transferring said recognition data to said second terminal from said first terminal, said recognition data is provided through image recording.

5. The method according to claim 1, further comprising using one of the first or second terminals to perform at least one of:
entering a description of the transaction,
entering a private description of the transaction,
selecting a different transaction currency, or
entering an alias for a user.

6. The method according to claim 1, using encryption based on Public Key Infrastructure (PKI) where the server has a private key and every terminal has a corresponding public key.

7. The method according to claim 1, using a SSL protocol for communication to and from the server.

8. The method of claim 1, further comprising:
composing a message containing a unique identity of the terminal, a user identity and a secret code,
adding a random data to the message,
encrypting the message,
decrypting the message in said server and comparing the secret code with one stored in a database, and
if the correct secret code, creating an application session having a unique identity and comprising information about a user and terminal identity.

9. The method of claim 1, wherein generating and providing a recognition data includes using a standard image tag for the challenge barcode in a HTML page, and when the browser renders the HTML page, automatically sending an HTTPS GET request to the server for a URL in the tag.

10. The method of claim 1, comprising the step of effectuating or storing information about the transaction by said server.

11. The method of claim 1, wherein said step of verifying by said server said decoded recognition data and, based on verification of said decoded recognition data, providing a second data set comprising the transaction information to said second terminal comprises:
verifying a challenge number and sending the second data set to the second terminal,
validating by the server the decoded recognition data to determine the terminal's identity and a user identity have been stored together in the database, the server looking up the challenge number in its database, and
based on verification of the challenge number, creating a new application session for a second application transmitting session number to the second terminal.

12. A non-transitory computer-readable medium comprising a plurality of computer-readable instructions, the plurality of computer-readable instructions configured to cause one or more processors to execute operations comprising:
receiving a first authentication data by a server from a first mobile terminal using a first dedicated application;
verifying, by said server, said first authentication data;
in response to said server verifying said first authentication data, erasing, by said first mobile terminal using said first dedicated application, said first authentication data from a memory of said first mobile terminal;
providing a first data set comprising a transaction data and a unique identity of said first mobile terminal by said first mobile terminal to the server;
generating and providing a recognition data, not including a transaction data, by said server to said first mobile terminal, wherein the recognition data includes a randomly generated challenge number that is stored in a local database together with a current time and information about a browser session of the server, the challenge number being converted to a short text string in said server, and the recognition data comprises a barcode containing the text string before providing to said first mobile terminal;
transferring said recognition data to a second mobile terminal from said first mobile terminal;
decoding said recognition data by said second mobile terminal using a second dedicated application;
providing said server by said second mobile terminal said decoded recognition data and a second identity;
verifying by said server said decoded recognition data and, based on verification of said decoded recognition data, providing a second data set comprising a transaction information to said second mobile terminal, wherein the second data set is verified by a buyer;
based on verification of the second data set, accepting the transaction by receiving a second authentication data by said second mobile terminal via the dedicated application in said second mobile terminal; and
verifying, by said server, the second authentication data by comparing it with authentication data stored in said server;
in response to said server verifying said second authentication data, performing, by said server, a transaction; and
in response to said server verifying said second authentication data, erasing, by said second mobile terminal using said second dedicated application, the second authentication data from a memory of said second mobile terminal.

13. A system for executing a peer-to-peer transaction between a first mobile terminal of a seller and a second mobile terminal of a buyer, the first and second mobile terminals authenticated by a server, the system comprising:
the first mobile terminal comprising a first transceiver, a first microprocessor and a first memory, wherein the first microprocessor is configured to:

provide a first authentication data to the server using a first dedicated application, erase the first authentication data from the first memory, using the first dedicated application, upon verification of the first authentication data by the server, provide a first data set comprising a transaction data and a unique identity of the first mobile terminal to the server, receive a recognition data, not including the transaction data, from the server, transfer the recognition data from the first mobile terminal to the second mobile terminal;

the second mobile terminal comprising a second transceiver, a second microprocessor and a second memory, wherein said second microprocessor is configured to:

decode the recognition data transferred from the first mobile terminal, using a second dedicated application, provide the decoded recognition data to the server with a second identity for the second mobile terminal, based on verification of the decoded recognition data is, receive a second data set comprising a transaction information from the server, based on verification of the second data set is verified, accept the transaction by receiving a second authentication data via the second dedicated application in the second mobile terminal, and erase the second authentication data from the second memory upon verification of the second authentication data by the server; and the server for authentication of the first and second mobile terminals, comprising a processor, a third memory and a communication interface, wherein the processor is configured to:

receive the first authentication data from the first mobile terminal, verify the first authentication data, receive the first data set comprising the transaction data and the unique identity of the first mobile terminal from the first mobile terminal, generate and provide the recognition data, not including the transaction data, to the first mobile terminal, wherein the recognition data includes a randomly generated challenge number that is stored in a local database together with a current time and information about a browser session of the server, the challenge number being converted to a short text string in said server, and the recognition data comprising a barcode containing the text string before providing to the first mobile terminal, receive from the second mobile terminal the decoded recognition data with the second identity, verify the decoded recognition data and, based on verification of the decoded recognition data, provide the second data set comprising the transaction information to the second mobile terminal, verify the second authentication data by comparing it with authentication data stored in the server, and perform the transaction upon verification of the second authentication data.

* * * * *